(No Model.)
M. PALEN.
ADJUSTABLE CLEVIS FOR VINEYARD AND ORCHARD PLOWS.
No. 369,809. Patented Sept. 13, 1887.
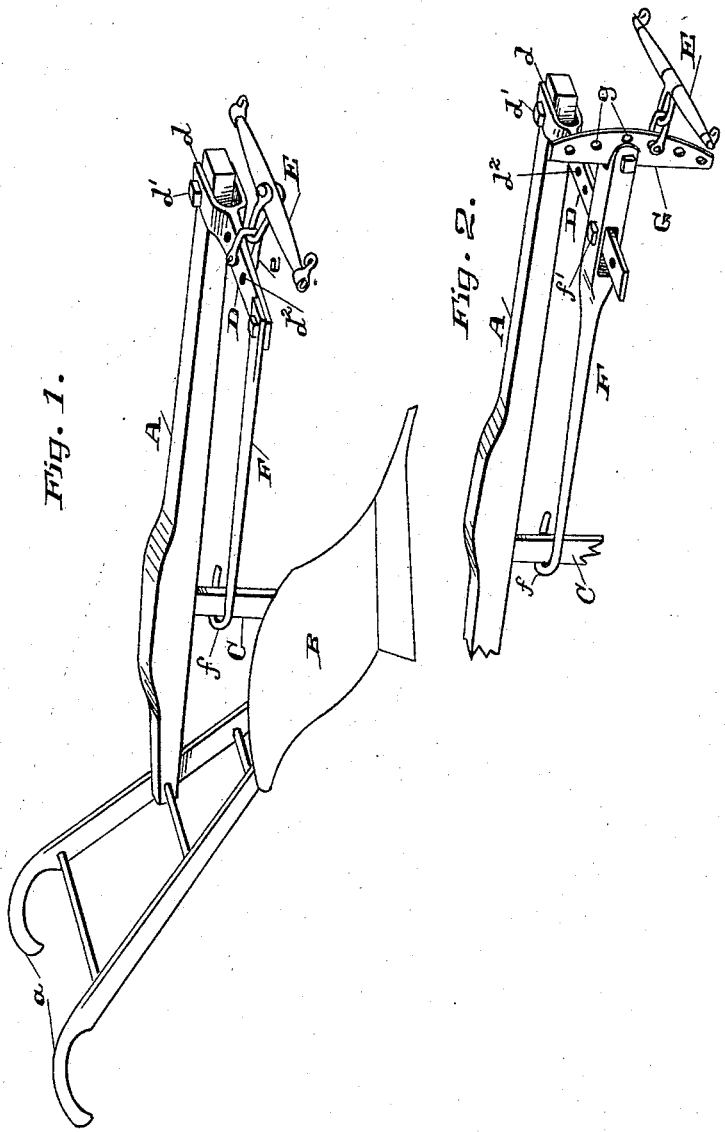
Witnesses,
Geo. G. Strong
J. L. Rouse
Inventor,
M. Palen
By Dewey & Co.
Att'ys
N. PETERS, Photo-Lithographer, Washington, D. C.

United States Patent Office.

MATTHEW PALEN, OF TREGO, CALIFORNIA.

ADJUSTABLE CLEVIS FOR VINEYARD AND ORCHARD PLOWS.

SPECIFICATION forming part of Letters Patent No. 369,809, dated September 13, 1887.

Application filed April 27, 1887. Serial No. 236,362. (No model.)

*To all whom it may concern:*

Be it known that I, MATTHEW PALEN, of Trego, Los Angeles county, State of California, have invented an Improvement in Adjustable Clevises for Vineyard and Orchard Plows; and I hereby declare the following to be a full, clear, and exact description of the same.

My invention relates to the class of plows for use in vineyards and orchards where it is necessary to plow close to the vine or tree.

My invention consists in a novel adjustable clevis or draft mechanism, whereby the horse may travel to one side of the beam, leaving its other side clear, and adapting it to be run close up to the vine or tree without danger or liability of injury to the bark.

The object of my invention is to provide simple, economical, and effective means for allowing the plow to travel close to the vines and trees without injuring them.

Referring to the accompanying drawings for a more complete explanation of my invention, Figure 1 is a perspective view of a plow, showing my adjustable clevis. Fig. 2 is a perspective view showing the vertical as well as the lateral adjustment.

A is the beam of a plow, having the handles $a$.

B is the plow-bottom, and C is the standard by which it is secured to the beam.

D is a horizontal arm or bar, one end, $d$, of which is slotted and fits over the beam, to which it is secured by bolt $d'$. This arm is provided with a series of holes, $d^2$, for securing the clevis $e$ of the whiffletree E. This clevis, by being secured in any of these holes, may be moved closer to or farther away from the beam, and thus determine the position of the whiffletree and the path of the travel of the horse with relation to the line of the beam. The outer end of the arm D has secured to it a brace, F, the other end of which has a hook, $f$, by which it engages the standard C of the plow-bottom. This brace, in addition to holding the arm D, serves also to equalize the draft, so that, though the horse does work on one side of the beam, the line of draft is not sidewise.

In Fig. 2 I show a modification which enables me to provide for the vertical regulation of the draft as well as its lateral adjustment. In this case the forward end of the brace F is slotted over the arm D, so that it may be moved in and out upon it. It is secured in any desired position by means of a bolt, $f'$, through any of the series of holes in the arm. Its end projects beyond the arm and carries a vertical strip or bar, G, in which are holes $g$ at different heights, and in which the securing-bolt of the whiffletree-clevis is seated. The movement of the brace sidewise regulates the lateral draft, and the movement of the whiffletree-clevis up or down provides for the vertical draft.

All the parts are readily removable, so that they may be placed on the other side of the beam. I am thus enabled to keep one side of the beam and plow clear, and I can run it close up to the vines and trees without danger.

By the reversal of the parts I can so run the plow as to throw the dirt to or from the vines or trees.

Having thus described my invention, what I claim as new, and desire to secure by Letters Patent, is—

The combination, with the beam and the standard of the plow-bottom, of a laterally-extending arm or bar having one end slotted on said beam, a brace, F, adjustably secured to said bar, having its rear end formed with a hook for engaging the plow-standard and its front end carrying a vertical strip or bar having holes for adjustably securing the whiffletree-clevis, substantially as herein described.

In witness whereof I have hereunto set my hand.

MATTHEW PALEN.

Witnesses:
A. H. TILDEN,
JOHN SEXTON.